(12) United States Patent
Srinivasan et al.

(10) Patent No.: US 7,836,017 B1
(45) Date of Patent: Nov. 16, 2010

(54) FILE REPLICATION IN A DISTRIBUTED SEGMENTED FILE SYSTEM

(75) Inventors: Sudhir Srinivasan, Acton, MA (US); Boris Zuckerman, Marblehead, MA (US); Vitaly Oratovsky, Newton, MA (US); Manny Ye, Waltham, MA (US); Dinesh Venkatesh, Westford, MA (US); Kevin J. Shea, Boxborough, MA (US); Shaji O. John, Charlestown, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 220 days.

(21) Appl. No.: 11/772,800

(22) Filed: Jul. 2, 2007

Related U.S. Application Data (63) Continuation-in-part of application No. 10/832,808, filed on Apr. 27, 2004, now abandoned, which is a continuation of application No. 09/950,555, filed on Sep. 11, 2001, now Pat. No. 6,782,389.

(60) Provisional application No. 60/232,102, filed on Sep. 12, 2000.

(51) Int. Cl.
*G06F 17/30* (2006.01)

(52) U.S. Cl. .................. 707/634; 707/636; 707/638; 707/999.2

(58) Field of Classification Search .............. 707/1, 707/10, 100, 101, 200–205, 634–638, 999.2, 707/999.203; 709/208–211, 213; 711/147, 711/154
See application file for complete search history.

(56) References Cited

U.S. PATENT DOCUMENTS

| 4,901,231 | A | 2/1990 | Bishop et al. |
|---|---|---|---|
| 5,455,953 | A | 10/1995 | Russell |
| 5,513,314 | A | 4/1996 | Kandasamy et al. |
| 5,828,876 | A | 10/1998 | Fish et al. |
| 5,873,103 | A | 2/1999 | Trede et al. |
| 5,909,540 | A | 6/1999 | Carter et al. |
| 5,948,062 | A | 9/1999 | Tzelnic et al. |
| 5,960,446 | A | 9/1999 | Schmuck et al. |
| 5,987,506 | A | 11/1999 | Carter et al. |
| 6,014,669 | A | 1/2000 | Slaughter et al. |
| 6,023,706 | A | 2/2000 | Schmuck et al. |
| 6,026,474 | A | * | 2/2000 | Carter et al. ............. 711/202 |

(Continued)

OTHER PUBLICATIONS

Anderson, Thomas E. "Severless Network File Systems" *ACM Transactions on Computer Systems*, Feb. 1996, vol. 14(1), pp. 41-79.

(Continued)

*Primary Examiner*—Marc R Filipczyk (57) ABSTRACT

A system includes storage configured to store file system entities, including directories and files, residing in segments of a distributed, segmented single file system, file servers configured to implement the single file system with separate ones of the file servers controlling metadata of separate ones of the segments, and a controller configured to control storage of files in the file system such that for a master file stored in a first segment, a first replica of the master file will be stored in a second segment that is physically separate from the first segment, the controller being further configured to control storage of directories in the file system such that a single directory will include identifiers for the master file and the first replica.

16 Claims, 6 Drawing Sheets

U.S. PATENT DOCUMENTS

| | | | |
|---|---|---|---|
| 6,029,168 A | 2/2000 | Frey | |
| 6,061,504 A | 5/2000 | Tzelnic et al. | |
| 6,163,801 A | 12/2000 | O'Donnell et al. | |
| 6,173,293 B1 | 1/2001 | Thekkath et al. | |
| 6,185,601 B1 | 2/2001 | Wolff | |
| 6,192,408 B1 | 2/2001 | Vahalia et al. | |
| 6,301,605 B1 | 10/2001 | Napolitano et al. | |
| 6,324,581 B1 | 11/2001 | Xu et al. | |
| 6,345,244 B1 | 2/2002 | Clark | |
| 6,345,288 B1 | 2/2002 | Reed et al. | |
| 6,356,863 B1 | 3/2002 | Sayle | |
| 6,385,625 B1 | 5/2002 | Slaughter | |
| 6,389,420 B1 | 5/2002 | Vahalia et al. | |
| 6,401,126 B1 | 6/2002 | Douceur et al. | |
| 6,442,608 B1 | 8/2002 | Knight et al. | |
| 6,453,354 B1 | 9/2002 | Jiang et al. | |
| 6,493,804 B1 | 12/2002 | Soltis et al. | |
| 6,516,320 B1 | 2/2003 | Odom et al. | |
| 6,556,998 B1 | 4/2003 | Mukherjee et al. | |
| 6,564,228 B1 | 5/2003 | O'Connor | |
| 6,571,259 B1 | 5/2003 | Zheng et al. | |
| 6,615,223 B1 * | 9/2003 | Shih et al. | 707/625 |
| 6,654,912 B1 | 11/2003 | Viswanathan et al. | |
| RE38,410 E | 1/2004 | Hersch et al. | |
| 6,697,835 B1 | 2/2004 | Hanson et al. | |
| 6,697,846 B1 | 2/2004 | Soltis | |
| 6,742,035 B1 | 5/2004 | Zayas et al. | |
| 6,748,447 B1 | 6/2004 | Basani et al. | |
| 6,772,161 B2 | 8/2004 | Mahalingam et al. | |
| 6,775,703 B1 | 8/2004 | Burns et al. | |
| 6,782,389 B1 | 8/2004 | Chrin et al. | |
| 6,823,336 B1 | 11/2004 | Srinivasan et al. | |
| 6,938,039 B1 | 8/2005 | Bober et al. | |
| 6,973,455 B1 | 12/2005 | Vahalia et al. | |
| 6,976,060 B2 | 12/2005 | Manczak et al. | |
| 7,054,910 B1 * | 5/2006 | Nordin et al. | 709/208 |
| 7,058,727 B2 | 6/2006 | Dingsor et al. | |
| 7,146,377 B2 | 12/2006 | Nowicki et al. | |
| 7,162,486 B2 * | 1/2007 | Patel et al. | 1/1 |
| 7,203,731 B1 | 4/2007 | Coates et al. | |
| 7,406,484 B1 * | 7/2008 | Srinivasan et al. | 707/200 |
| 7,711,702 B2 * | 5/2010 | Smolen et al. | 1/1 |
| 2002/0059309 A1 | 5/2002 | Loy et al. | |
| 2002/0095479 A1 | 7/2002 | Schmidt | |
| 2002/0120763 A1 | 8/2002 | Miloushev et al. | |
| 2002/0138501 A1 | 9/2002 | Dake | |
| 2002/0138502 A1 | 9/2002 | Gupta | |
| 2002/0143734 A1 | 10/2002 | Loy et al. | |
| 2002/0161855 A1 | 10/2002 | Manczak et al. | |
| 2003/0004947 A1 | 1/2003 | Coverston | |
| 2003/0028587 A1 | 2/2003 | Driscoll et al. | |
| 2003/0033308 A1 | 2/2003 | Patel et al. | |
| 2003/0079222 A1 | 4/2003 | Boykin et al. | |
| 2003/0110237 A1 | 6/2003 | Kitamura et al. | |
| 2003/0115434 A1 | 6/2003 | Mahalingam et al. | |
| 2003/0115438 A1 | 6/2003 | Mahalingam et al. | |
| 2003/0135514 A1 * | 7/2003 | Patel et al. | 707/102 |
| 2004/0133570 A1 | 7/2004 | Soltis | |
| 2007/0022117 A1 * | 1/2007 | Keohane et al. | 707/8 |

OTHER PUBLICATIONS

Aversa, Luis, et al. Load Balancing a Cluster of Web Servers Unsing Distributed Packet Rewriting, Boston University, pp. 1-14, Publ. 1999.

Cardellini, Valeria, et al. "Geographic Load Balancing for Scalable Distributed Web Systems" *IEEE*, pp. 20-27 2000.

Corbett, Peter F., et al. "The Vesta Parallel File System", *ACM Transactions on Computer Systems* vol. 14(3), pp. 225-264 (1996).

Grant, David, Microsoft TechNet—Web Server Clustering, Jun. 8, 2000, pp. 1-7, downloaded from the Internet at [http://www.technet.microsoft.com/en-us/library/Bb742600d(=printer).aspx]on Oct. 18, 2007.

Guan, Ping, et al. A Survey of Distributed File Systems, pp. 1-11, Pub. 1999.

Karniadakis, et al. "Nodes, Modes, and Flow Codes", *Physics Today* (Mar. 1993) pp. 34-42.

Ligon, III, Walter, et al. "An Overview of the Parallel Virtual File System", *Proceedings of the 1999 Extreme Linux Workshop* (1999) pp. 1-8.

Levy and Silberschatz (1990) ACM Computing Surveys 22:321-373.

Morris, et al. (1986) Communications of the ACM29:184-201.

* cited by examiner

FILE REPLICATION IN A DISTRIBUTED SEGMENTED FILE SYSTEM

CROSS-REFERENCES TO RELATED APPLICATIONS

This application is a continuation-in-part of U.S. patent application Ser. No. 10/832,808, filed Apr. 27, 2004, which is a continuation of U.S. patent application Ser. No. 09/950,555, now U.S. Pat. No. 6,782,389, filed Sep. 11, 2001, which claims the benefit of U.S. Provisional Patent Application Ser. No. 60/232,102, filed Sep. 12, 2000, all of which are incorporated here in their entireties for all purposes.

BACKGROUND OF THE INVENTION

Data generated by, and used by, computers are often stored in file systems. File system designs have evolved from server-centric models (that can be thought of as local file systems) to storage-centric models (that can be thought of as networked file systems).

Stand-alone personal computers exemplify a server-centric model—storage has resided on the personal computer itself, initially using hard disk storage, and more recently, optical storage. As local area networks ("LANs") became popular, networked computers could store and share data on a so-called file server on the LAN. Storage associated with a given file server is commonly referred to as server attached storage ("SAS"). Storage could be increased by adding disk space to a file server. SAS systems are expandable internally and there is no transparent data sharing between file servers. Further, with SASs, throughput is governed by the speed of a fixed number of busses internal to the file server. Accordingly, SASs also exemplify a server-centric model.

As networks have become more common, and as network speed and reliability increased, network attached storage ("NAS") has become popular. NAS systems are easy to install and each NAS, individually, is relatively easy to maintain. In a NAS system, a file system on a server is accessible from a client via a network file system protocol like NFS or CIFS.

NFS and CIFS are layered protocols that allow a client to request a particular file from a pre-designated server. The client's operating system translates a file access request to the NFS or DFS format and forwards it to the server. The server processes the request and in turn translates it to a local file system call that accesses the information on magnetic disks or other storage media. Using this technology, a file system can expand to the limits of an NAS machine. Typically no more than a few NAS units and no more than a few file systems are administered and maintained. In this regard, a NAS system can be thought of as using a server-centric file system model.

Storage area networks (SANs) (and clustered file systems) exemplify a storage-centric file system model. SANs provide a simple technology for managing a cluster or group of disk-storage units, effectively pooling such units. SANs use a front-end system that can be a NAS or a traditional server. SANs (i) are easy to expand, (ii) permit centralized management and administration of the pool of disk storage units, and (iii) allow the pool of disk storage units to be shared among a set of front-end server systems. Moreover, SANs enable various data protection/availability functions such as multi-unit mirroring with failover. SANs, however, are expensive and while they permit space to be shared among front-end server systems, they do not permit multiple SAN environments to use the same file system. Thus, although SANs pool storage, they basically behave as a server-centric file system. That is, a SAN behaves like a fancy (e.g., with advanced data protection and availability functions) disk drive on a system. Also, various incompatible versions of SANs have emerged.

BRIEF SUMMARY OF THE INVENTION

In general, in an aspect, the invention provides a system including storage configured to store file system entities, including directories and files, residing in segments of a distributed, segmented single file system, file servers configured to implement the single file system with separate ones of the file servers controlling metadata of separate ones of the segments, and a controller configured to control storage of files in the file system such that for a master file stored in a first segment, a first replica of the master file will be stored in a second segment that is physically separate from the first segment, the controller being further configured to control storage of directories in the file system such that a single directory will include identifiers for the master file and the first replica.

Implementations of the invention may include one or more of the following features. The controller is further configured such that a second replica of the master file will be made and identifiers for the first and second replicas will be stored in the single directory. Identifiers for all replicas of the master file will be stored in the single directory. The controller is configured to control the storage of the replicas such that no replica of the master file is stored in the same segment as the master file. The first replica is a synchronous replica. The controller is further configured such that second and third replicas of the master file will be made, where the second replica is a synchronous replica and the third replica is an asynchronous replica. The controller is configured to store the master file and the first replica based upon a non-hierarchical allocation policy. The controller is configured to reproduce an inaccessible segment using replicas in other segments of file system entities in the inaccessible segment.

Embodiments of the invention may provide one or more of the following capabilities. Cloned files can be tracked and filed on physically different segments of a distributed, segmented file system. Storage bricks of a distributed, segmented file system can be rebuilt. Access to files on damaged or inaccessible devices can be provided via replicas while rebuild operations proceed. Access to files that are accessed heavily can be improved by using replicas to service the different accesses.

DETAILED DESCRIPTION OF THE INVENTION

Embodiments of the invention provide techniques for filing and tracking cloned or replicated file system entities in a distributed, segmented file system. For example, multiple duplicate file system entities can be produced from a master file system entity and stored on physically separate devices in distinct file system segments that are controlled by distinct servers. One or more duplicates can be produced synchronously such that the duplicates match the master file system entity, with the duplicates being updated (e.g., modified or re-copied) when the master is changed. One or more duplicates can be produced asynchronously such that the duplicates may be updated after the master is changed. Preferably, asynchronous duplicates are labeled as either ready (i.e., updated, matching the master), or not ready (i.e., not matching or not confirmed to be matching the master). Inode numbers of duplicate file system entities are stored in a single directory entry with the inode number of the master. Different quantities of duplicates may be made for different masters, e.g., depending upon the demand for use (e.g., frequency of use) of the masters. Duplicates may be used to provide load balancing and can be used for parallel write operations on a file system entity. Other embodiments are within the scope of the invention.

Figure 1:
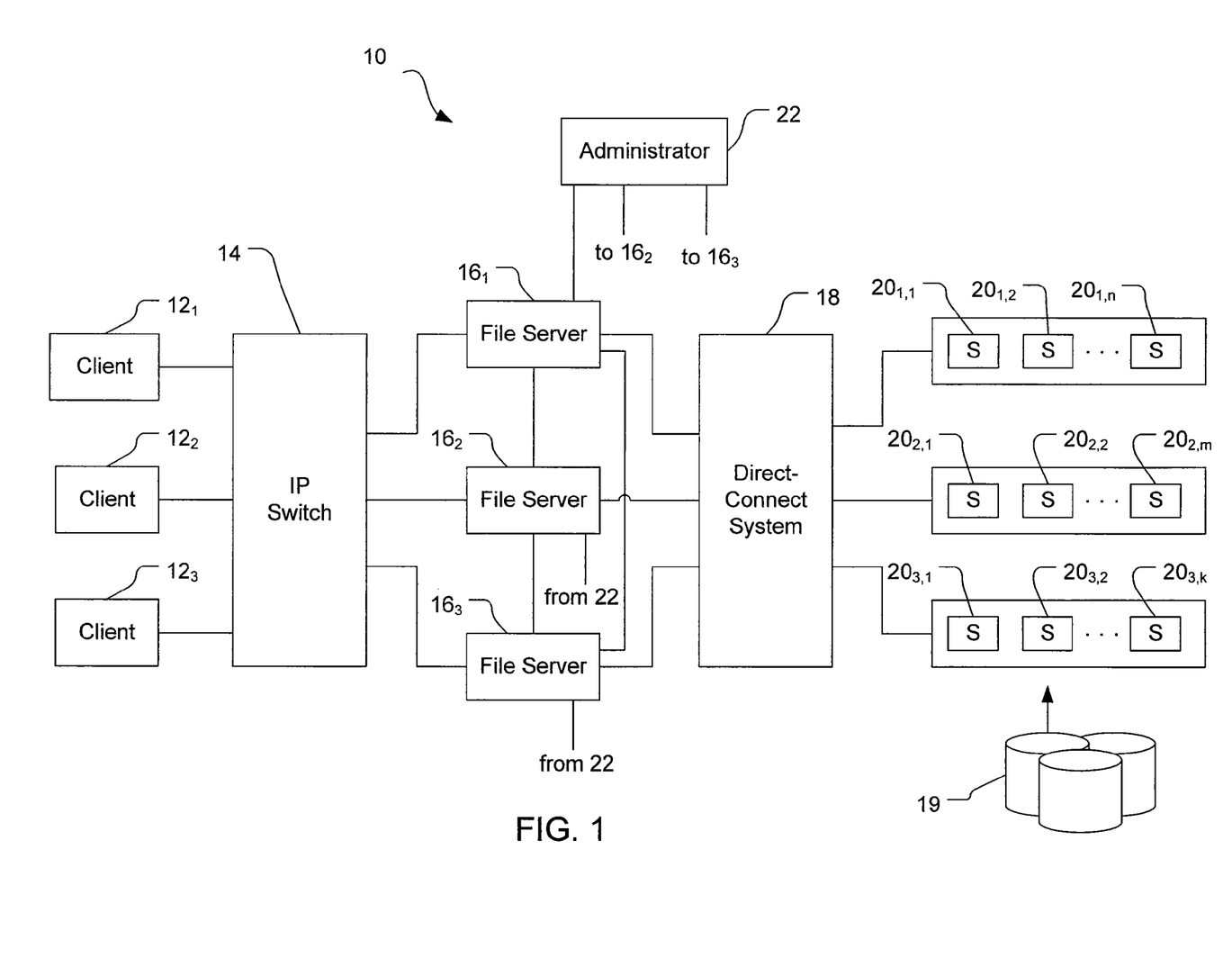
FIG. 1 is a simplified block diagram of a distributed-file system.

Referring to FIG. 1, a data storage and access system 10 comprises clients $12_1$-$12_3$, an internet protocol (IP) switch 14, file servers $16_1$-$16_3$, a direct-connect system 18 such as a Serial-Attached SCSI system, storage 19, and an administrator 22. Optionally, instead of the direct-connect system 18, a network or other transmission apparatus may be used to connect the servers 16 and the segments 20 such as a fiber channel network, Infiniband network, iSCSI network, or any of numerous high-speed interconnects available now or in the future. Although three clients 12 and three file servers 16 are shown, other numbers of these devices/systems may be used, and the quantities of the items need not be the same. Further, while only one IP switch 14 is shown, more than one IP switch may be used. The storage 19 can be any of a variety of physical media, such as disks, and provides a virtualized file system. As indicated in FIG. 1, the storage 19 stores segments $20_{m,n}$ that are portions of a file system and that may be stored anywhere physically on the storage 19, but whose data are logically grouped into the segments 20. Segments are typically incomplete portions of the file system in that they may refer to file system entities in other segments. For example, a directory/folder of files in the segment $20_{1,3}$ can refer to other segments 20, e.g., the segment $20_{2,1}$ and/or the segment $20_{3,2}$ with addresses in these other segments $20_{2,1}$, $20_{3,2}$ where the corresponding files are stored. A group of the segments 20 is associated with, and controlled by, a corresponding one of the servers 16. For example, the segments $20_{1,x}$ are associated with and controlled by the server $16_1$, etc. The servers 16 control the segments 20 in that the servers 16 arbitrate access to the segments 20, in particular modifying metadata including allocating file system blocks, modifying directories, etc. The file servers 16 can be any device or portion of a device that controls segment access. The system 10 provides a distributed file system in that the segments 20 of the file system are dispersed across the storage 19 such that it is not required that the file system be controlled by one server 16 and allows for multiple servers 16 to simultaneously control portions of the file system. The clients 12 and the IP switch 14, the IP switch 14 and the file servers 16, the file servers 16 and the System 18, and the System 18 and the storage 19 are configured and coupled for bi-directional communication. The file servers 16 may also be directly connected to the segments 20. Further, the file servers 16 are configured and coupled for bi-directional communication with each other and with the administrator 22.

The administrator 22 is configured to monitor the file servers 16, and collect information from and disseminate information to the file servers 16. The administrator 22 is also configured to allocate ranges of Inode numbers for new segments 20. The administrator 22 can determine when a file server 16 and/or storage (and thus room for new segments 20) is added to or removed from the system 10, determine appropriate new Inode numbers, and provide information to the file servers 16 so that the servers 16 can determine which file server 16 controls a particular segment 20 of the file system. For example, the administrator 22 can provide information to affect how the file servers 16 determine which file server 16 controls the file segment 20 associated with an incoming request. This may include, e.g., providing information to alter a mapping of segments 20 and file servers 16, or information to modify an algorithm used by the file servers 16 to determine the controlling file server 16 from an FID.

Any of the file servers 16 may be general computing devices, such as personal computers, workstations, etc. As such, the file servers 16 can include processors and memories that store software instructions that are executable by the processors for performing described functions. The file servers 16 may have their own local storage instead of or in addition to the storage 19 and can control/manage segments of a file system on their local storage. The file servers 16 may be clustered to work on a common issue and the clustered servers 16 may be managed/regulated in accordance with the invention.

The file servers 16 can assign file identifiers (FIDs) and allocate memory for write requests to the segments 20 that the servers 16 control. Each of the servers 16 can pre-allocate an amount of memory for an incoming write request. The amount of pre-allocated memory can be adjusted and is preferably a fixed parameter that is allocated without regard, or even knowledge, of a quantity of data (e.g., a size of a file) to be written. If the pre-allocated memory is used up and more is desired, then the server 16 can pre-allocate another portion of memory. The server 16 that controls the segment 20 to be written to will allocate an FID (e.g., an Inode number). The controlling server 16 can supply/assign the Inode number and the Inode, complete with storage block addresses. If not all of the pre-allocated block addresses are used by the write, then the writing server 16 will notify the controlling server 16 of the unused blocks, and the controlling server 16 can de-allocate the unused blocks and reuse them for future write operations.

The file servers 16 are also configured to produce and store backup paths to files and directories. The servers 16 are configured to produce shadow trees indicative of file or subdirectory ancestry where a file system object, e.g., a file or a subdirectory, is an orphan in that the parent directory of the file system object is located in a segment 20 other than the segment 20 containing the file system object. Shadow trees are preferably produced where a parent directory is located in a different segment 20. Each file server 16 can determine, e.g., in response to a write request, that an orphan (file system object) is, has been, or will be produced in a segment 20 different from the segment 20 in which its parent directory resides. Each file server 16 can determine and store an ancestry associated with the orphan.

Figure 2:
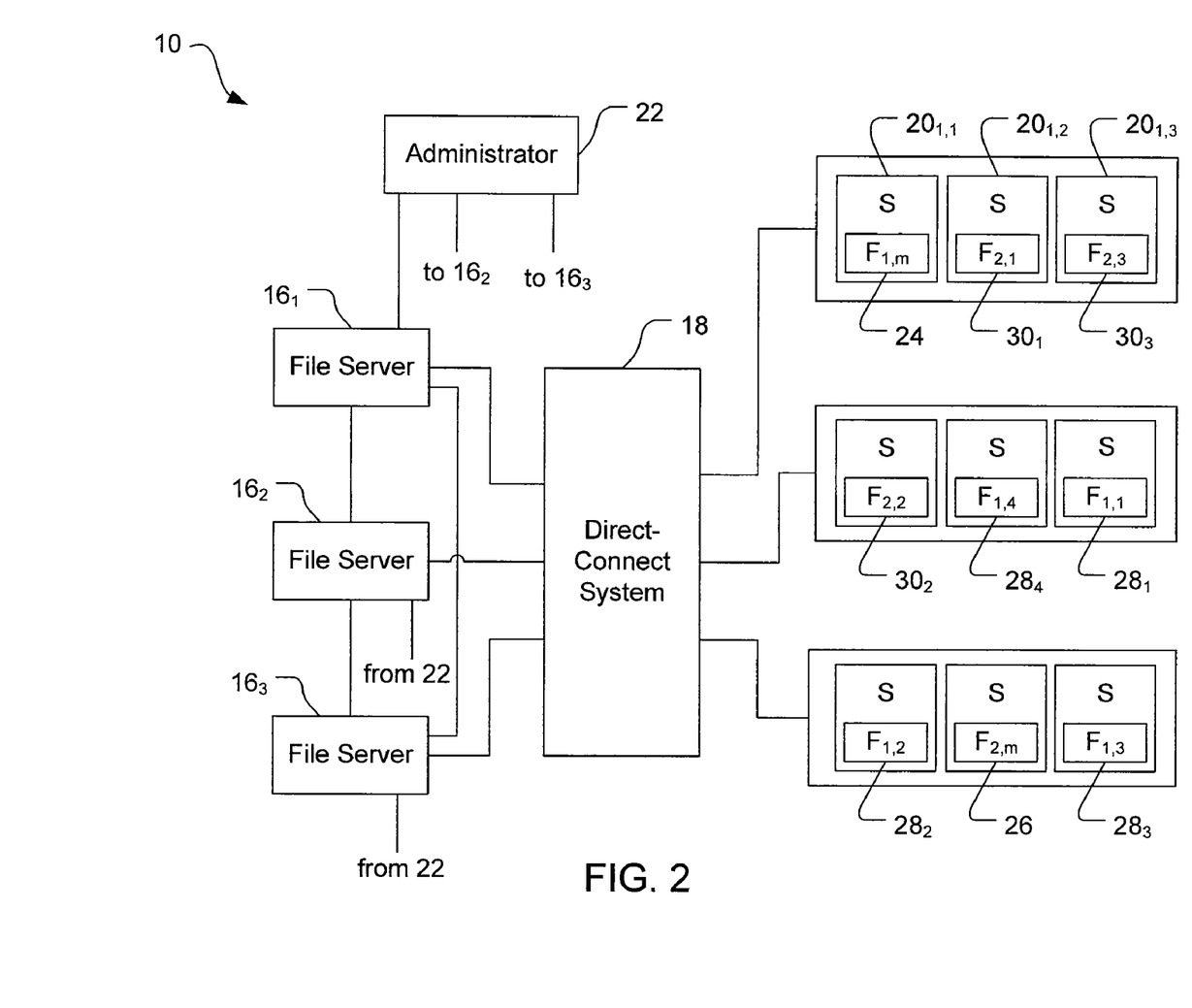
FIG. 2 is a simplified block diagram of a portion of the system shown in FIG. 1, showing master and replica files in file system segments.

Referring also to FIG. 2, the file servers 16 can also produce, access, and track replicas (clones) 28, 30 of master files 24, 26. The clients 12 can also produce, access, and track replicas but for simplicity the clients 12 are not shown in FIG. 2 (or FIG. 4 below, although clients could be used in the systems of either of these figures) and generally only the file servers 16 are discussed below. For each master file, preferably at least two replicas 28, 30 are made. The replicas 28, 30 can be made by any of the servers 16, but are preferably produced by the server 16 that controls the master file/directory or preferably by the client 12 that creates the master file. First and second replicas $28_1$, $28_2$, $30_1$, $30_2$ are synchronous replicas, with original modifications to the master 24, 26 or any of the synchronous replicas $28_1$, $28_2$, $30_1$, $30_2$ being made in the other synchronous replica(s) $28_1$, $28_2$, $30_1$, $30_2$ and master 24, 26 when the original modifications are made. Replicas $28_3$, $28_4$, $30_3$ beyond the first and second replicas $28_1$, $28_2$, $30_1$, $30_2$ are asynchronous, with original modifications to the master 24, 26 or the other replicas $28_1$, $28_2$, $28_3$, $28_4$, $30_1$, $30_2$, $30_3$ being made to the asynchronous replicas $28_3$, $28_4$, $30_3$ when convenient, which may be significantly after the original modifications were made. If a server 16 fails to produce either the first or second replica $28_1$, $28_2$, $30_1$, $30_2$, then an input/output error is produced indicating to the application that the input/output operation failed. If a server 16 fails to produce a replica beyond the first and second replicas $28_1$, $28_2$, $30_1$, $30_2$, then the server 16 will flag the error but operation of the server 16 proceeds and use of the other replicas is enabled. The server 16 may attempt to produce a replica for a predetermined, programmable amount of elapsed time or number of retry attempts, and determine that a failure occurs if the replica is not produced within this amount of time or within this number of retry attempts.

The servers 16 are configured to store file replicas in accordance with several rules. The servers 16 are configured to store each of the replicas 28, 30 in a segment 20 controlled by a different server 16 than the server 16 that controls the segment 20 in which the corresponding master file 24, 26 resides (i.e., no server 16 will store both a master file and a replica of that master file). The first replica of a file, e.g., the replica $28_1$ corresponding to the master file 24, is stored based upon an allocation policy, e.g., a non-hierarchical allocation policy, that may also be used to determine where to store the master files 24, 26. Further replicas may be stored in accordance with this allocation policy, may be stored in segments 20 associated with the segment 20 where the first replica or the master file is stored, may be stored in replica pools of segments 20, and/or in accordance with other policies and/or file/replica relationships. Further constraints may be placed on location selection of replicas, e.g., that the first and second replicas cannot be on the same server 16, or that the master cannot be on the same server 16 as any of the replicas and no two replicas can be on the same server 16, etc.

There may be relationships between the segments 20 that influence where replica files are stored. The segments 20 may be paired to hold the first and second replicas of a file such that once the segment 20 is chosen to hold the first replica, the segment 20 for storing the second replica is known. The segments 20 may have associated replica segments 20 so that for files stored on a give segment 20, one or more of their corresponding replicas are stored on one or more of the associated replica segments.

Figure 3:
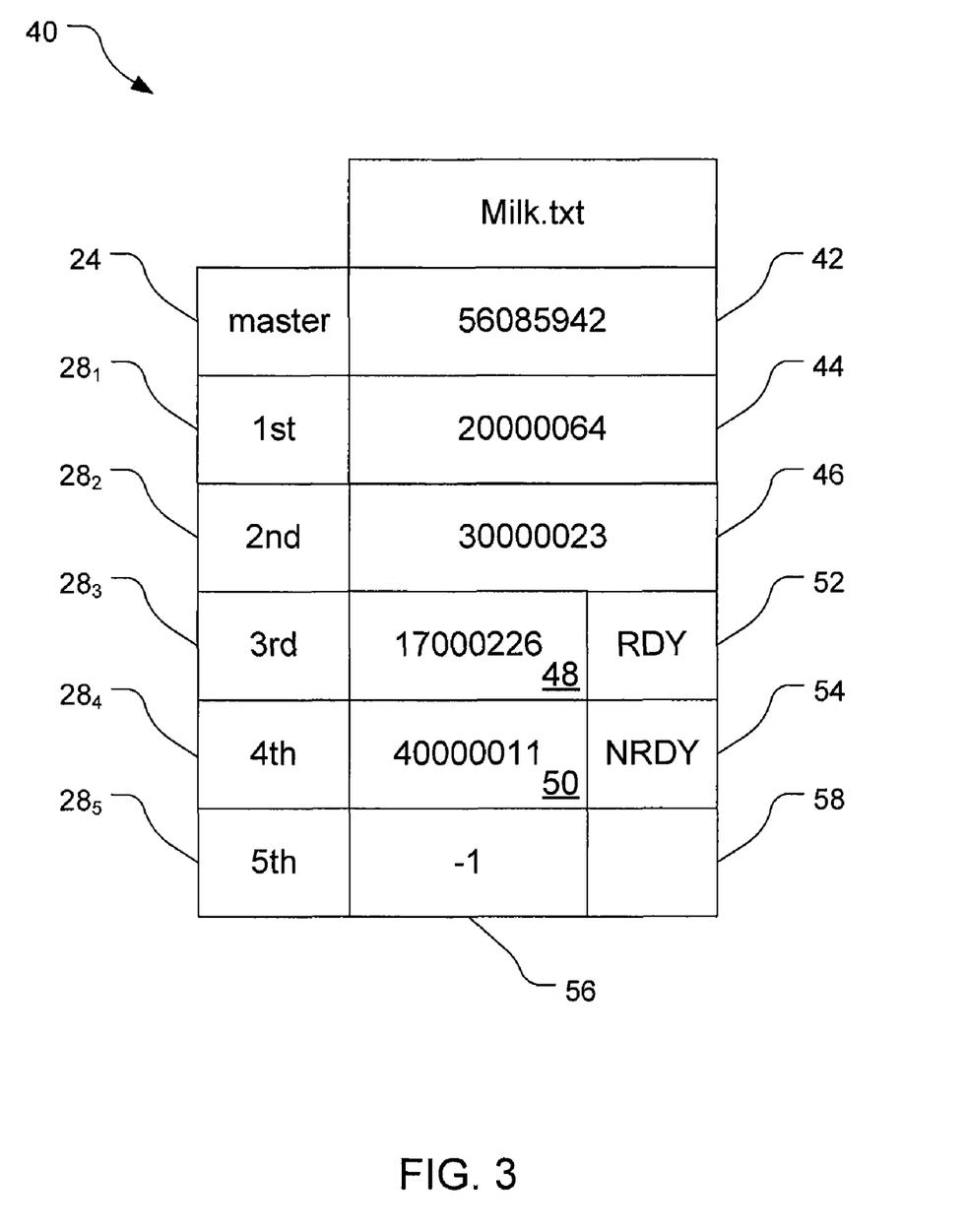
FIG. 3 is a diagram of a directory entry showing Inodes of a master file, replica files, and an available slot for a replica file.

Referring also to FIG. 3, the servers 16 are configured to store directory entries. The directory entries point to the replicas, preferably with a single directory entry pointing to all of the replicas for a given master file. As shown in FIG. 3, a directory entry 40 for the master copy/replica 24 titled "milk.txt" includes an inode number 42 of the master file 24, and Inode numbers 44, 46, 48, 50 for the replicas $28_1$, $28_2$, $28_3$, $28_4$. The replicas $28_1$, $28_2$ are synchronous replicas while the replicas $28_3$, $28_4$, $28_5$ are asynchronous replicas and thus include the Inode numbers 48, 50 and status indicators 52, 54. As shown, the status indicator 52 indicates that the third replica $28_3$ is ready and the status indicator 54 indicates that the fourth replica $28_4$ is not ready (e.g., has not been updated yet with a modification made to the master 24 and/or one or more of the replicas $28_1$, $28_2$, $28_3$. A fifth replica $28_5$ is possible but no fifth replica has been made of the master 24, as indicated by a −1 (although other indications may be used) as an Inode number 56 and no entry in a status indicator 58. A capacity of five replicas is exemplary only, as more or fewer replicas may be provided for and used.

The file servers 16 can access the replicas 28, 30 for load balancing purposes. The file servers 16 can read from the replica files 28, 30 instead of the master files 24, 26. The servers 16 can access any of the master files 24, 26 or the replica files 28, 30 and may request access for any of the files 24, 26, 28, 30 in any order until an available file is found. Alternatively, a priority of files may be used, e.g., requesting access to the master file 24, 26 first, and then requesting access to the replica files 28, 30 in order until an available file is found. The priority may be based on a load balancing algorithm such that a replica is chosen because the server 16 that owns the replica is the least-loaded server 16 among all servers 16 owning a replica of that file.

The servers 16 can produce more replicas of high-demand, under-replicated files. The administrator 22 or the server 16 owning the master file 24 can determine that a file is being accessed frequently, and in particular which files have requests being denied or delayed due to lack of an available master or replica. The administrator 22 or owning server 16 can indicate to the servers 16 to, or any of the servers 16 can, make one or more replicas of these identified high-demand, under-replicated files. The replicas can then be used by the servers 16 and/or the clients 12 to help reduce access delays for these files. At a subsequent point in time, the administrator 22 or the servers 16 can determine that the frequency of access to these files has reduced sufficiently and correspondingly delete some or all of the asynchronous replicas, e.g., the replicas made in response to the determination that the file was under-replicated.

Figure 4:
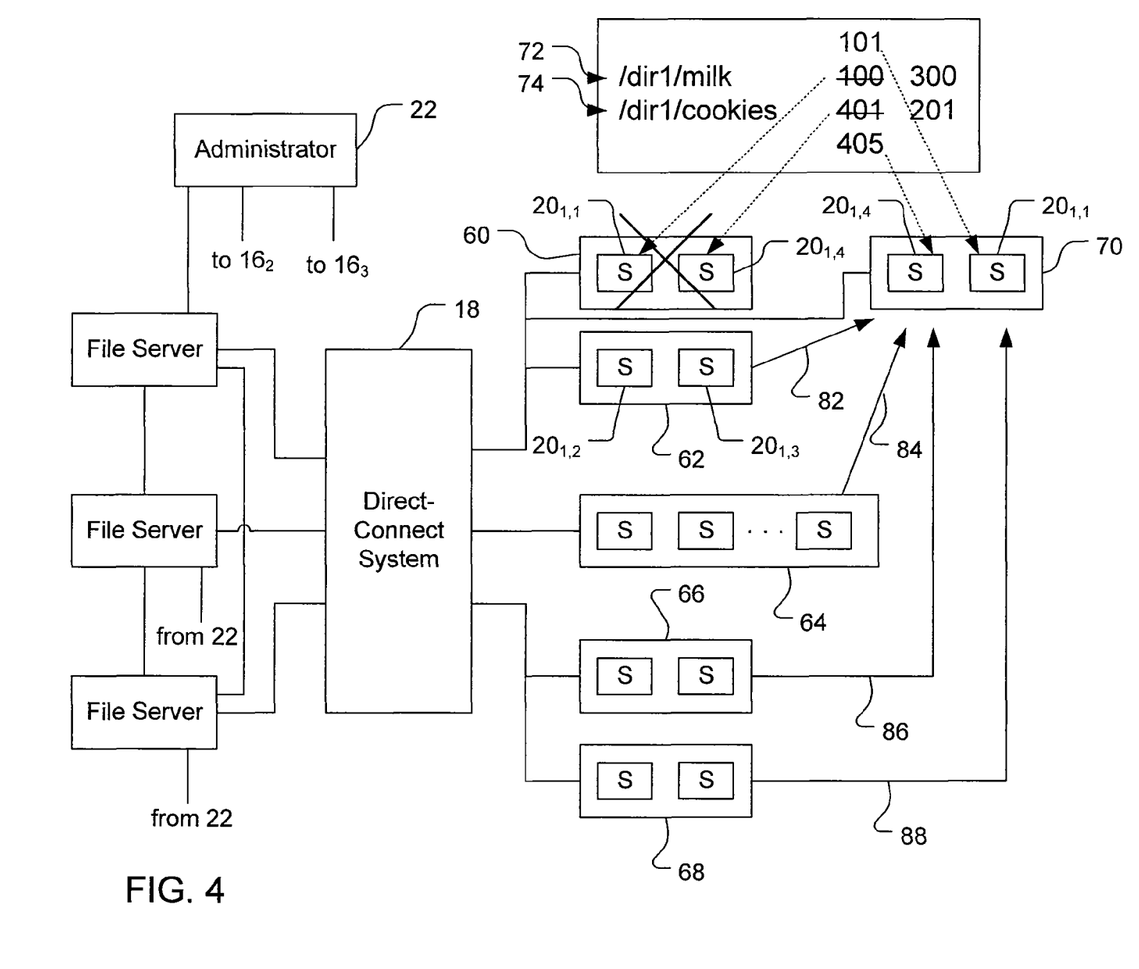
FIG. 4 is a simplified block diagram of a portion of the system shown in FIG. 1 illustrating segment rebuild using file replicas.

Referring to FIGS. 1 and 4, the servers 16 can use the replicas 28, 30 to rebuild segments 20 that are inaccessible (e.g., storage failure). The servers 16 can use the shadow directory structures to identify the master files and replica files to be restored. A discussion of shadow directory structures can be found in U.S. patent application Ser. No. 10/833,924, filed Apr. 28, 2004, which is incorporated here by reference. In the present example, segments $20_{1,1}$ and $20_{1,4}$ reside on a physical storage device 60 that becomes inaccessible. The servers 16 can copy the replica files and the master files stored on accessible physical storage devices 62, 64, 66, 68 as appropriate to a new storage area 70 to reproduce the inaccessible segments $20_{1,1}$ and $20_{1,4}$. This copying can be done in background operations and indicated by arrows 82, 84, 86, 88. The new segments $20_{1,1}$ and $20_{1,4}$ in the device 70 are preferably assigned the same segment numbers as the inaccessible segments $20_{1,1}$ and $20_{1,4}$ in the device 60, with the same Inode number ranges, although the new segments 20 may be assigned new segment numbers with correspondingly new Inode number ranges. The files are assigned new Inode numbers by the servers 16, and the directory entries pointing to the rebuilt segments are updated by the apparatus performing the repair (e.g., a server 16, a client 12, a special-purpose program or machine dedicated to performing repair work, etc.) to point to the new Inode numbers. For example, directory entries 72, 74 for files "milk" and "cookies" in directory "dir1" include inodes 100, 300 and 401, 201, respectively, with inodes 100 and 401 residing in segments $20_{1,1}$ and $20_{1,4}$, respectively. If any of the copies (of files) that were lost were master files (vs. replicas), a new master file is selected from among the existing and any newly created replicas for that file and the directory entry updated accordingly. Various criteria can be used for this selection (e.g. random, least loaded server, server with best response time, etc.) After reproduction of the segments $20_{1,1}$ and $20_{1,4}$ in the device 70, the directory entries are updated with new inode numbers 101 and 405 of the entities previously in the device 60 and now in the device 70.

Figure 5:
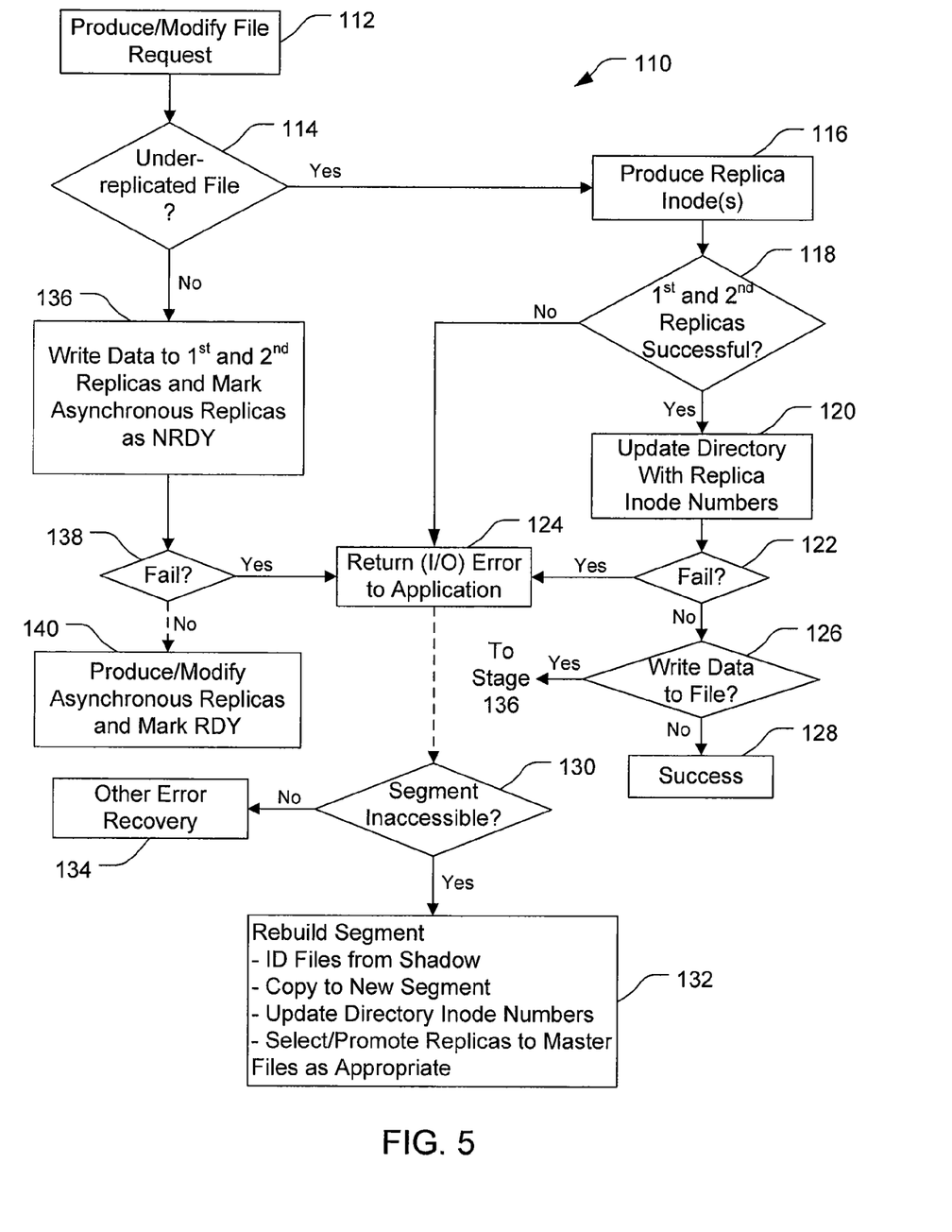
FIG. 5 is a block flow diagram of a process of producing, storing, tracking, modifying, and using file replicas.

In operation, referring to FIG. 5, with further reference to FIGS. 1-4, a process 110 includes the stages shown for producing, storing, tracking, modifying, and using file replicas. The process 110 is exemplary only and not limiting. The process 110 can be altered, e.g., by having stages added, removed, or rearranged. The process 110 describes logic for accomplishing tasks such that any given stage may be implemented by various apparatus of the system 10, e.g., a server 16, a client 12, the administrator 22. For example, an apparatus can communicate with the server 16 owning a directory or file if the logic calls for examination of a directory or replication of a file, respectively. While specific devices are mentioned below for certain tasks, these tasks do not necessarily have to be performed by the noted devices.

At stage 112, a request is received to produce, access or modify a file. For example, the request may be received from a client 12 at a server 16 or from an application process at a client 12.

At stage 114, an inquiry is made as to whether the file to be modified or produced is an under-replicated file. This inquiry is made, here, by the administrator 22, but could be made by other devices such as the server 16 receiving the request at stage 112, or another server 16. For file production and modification requests, the administrator 22 determines that the file is under-replicated (as no replicas or insufficient number of synchronous replicas exist) and the process 110 proceeds to stage 116. For file modification requests, the administrator 22 can determine that the file to be modified is an under-replicated file if the file is receiving a very high number of modification or access requests. The administrator 22 or client 12 can determine that the file is under-replicated if, for example, modification or access requests are being denied or delayed, especially where there are spots available for one or more replica files for the file in question. The administrator 22 or server 16 can determine that there are available possibilities for additional replica files by analyzing a directory including the corresponding master file and determining whether there are unused slots for replicas. For example, referring to FIG. 3, the master file 24 has four replica files $28_1$-$28_4$ already assigned and one available replica file spot $28_5$. The servers 16 can determine that a file is under-replicated, for example, if the server 16 is producing a master file 24. In this case, the server 16 knows that there are preferably at least two replica files 28 to be made. Further, the server 16 can determine that a file is under-replicated if the server 16 is in the process of producing a first replica $28_1$, in which case the server 16 knows that at least one more replica $28_2$ is preferably to be produced. If it is determined that the file to be modified is not under-replicated, then the process 110 proceeds to stage 136 described below, and otherwise proceeds to stage 116.

At stage 116, a server 16 makes one or more file replica inodes. The server 16 can make one or more replicas 28 in response to a command received from the administrator 22. The server 16 will also make one or more replicas 28 in response to producing the master file 24. The server 16 copies the master file 24 and stores the replicas 28 for future use. The server 16 preferably produces the first two replicas $28_1$-$28_2$ synchronously and modifies these replicas $28_1$-$28_2$ synchronously in the future. The server 16 stores the first replica $28_1$ in according with allocation protocol such that the first replica $28_1$ is stored under the control of a different server 16 than the server 16 that controls the master file 24. The server 16 further causes the other replicas $28_2$-$28_x$ to be stored in accordance with the allocation protocol or otherwise as desired, also under the control of one or more servers 16 other than the server 16 that controls the master file 24. Preferably, the server 16 ensures that the master file and all replicas are stored on different servers 16, although the server 16 may be configured otherwise as discussed above. The server 16 stores the third and higher replicas $28_3$-$28_x$ asynchronously and updates these replicas $28_3$-$28_x$ asynchronously in the future.

At stage 118, an inquiry is made as to whether the first and second replicas $28_1$-$28_2$ were successfully produced. The server 16 initiates a timer once a replica is attempted to be made. If the timer expires before the replica is made, then the server 16 determines that the replica attempt has failed. Failure can also be determined in a direct way by an unsuccessful termination of the creation operation(s) for various reasons (e.g. the target segment was not accessible). The server 16 determines whether both of the first and second replicas $28_1$-$28_2$ were produced and stored or if there was a failure to produce either of the replicas $28_1$-$28_2$. If the server 16 determines that there was a failure to produce either of these replicas $28_1$-$28_2$, then the process 110 proceeds to stage 124, and otherwise proceeds to stage 120.

At stage 120, the server 16 updates the appropriate directory with the Inode numbers of the replicas made at stage 114. The server 16 stores the Inode numbers in a single directory entry. In the example shown in FIG. 3, the server 16 stores the Inode numbers 42, 44, 46, 48, 50 in the single directory entry 40 such that server 16 can locate the replicas 28 and the corresponding master 24 by locating the directory entry 40 using any one of the Inode numbers 42, 44, 46, 48, 50, and analyzing other portions of the directory entry 40 for Inode numbers of other replicas 28 and/or the master file 24.

At stage 122, an inquiry is made as to whether the attempt to update the directory entry(ies) has failed. The server 16 initiates a timer once the directory update attempt begins. If the timer expires before the update is completed, then the server 16 determines that the directory update attempt has failed. Failure can also be determined in a direct way by an unsuccessful termination of the update operation(s) for various reasons (e.g. the storage device did not have any space left). If the directory update is successful, then, the process 110 proceeds to stage 126 described below, and otherwise (i.e., the directory update fails) the process 110 proceeds to stage 126.

At stage 124, an input/output error is returned to the application requesting the file production/modification. For example, the server 16 that was attempting to produce one of the first or second replica files $28_1$, $28_2$ initiates an input/output error indicating to the application that the input/output request failed. The foreground instance of the process 110 terminates, but may be performed again if a file production/modification request is received. The process 110 proceeds in the background to stage 130 (as indicated by the dotted line to stage 130) discussed below.

At stage 126, an inquiry is made as to whether data are to be written to a file. The server 16 determines whether data are to be written to the file, and if so, the process 110 proceeds to stage 136 discussed below. Otherwise, the server 16 determines that a blank file is to be produced and the process 110 proceeds to stage 128 where the server 16 determines that success is achieved in that the Inode has been properly produced and registered in the directory entry, and the process 110 terminates.

At stage 130, an inquiry is made as to whether one or more segments 20 is inaccessible. This inquiry can take several forms. For example, the administrator 22 or a server 16 can send an access request and use a response to this request or another request to determine if a segment 20 is inaccessible. If it is determined that a segment 20 in question, or any segment 20, is inaccessible, then the process 110 proceeds to stage 132, and otherwise proceeds to stage 134 discussed below.

At stage 132, one or more of the servers 16 rebuilds the segment 20 that was determined to be inaccessible at stage 130. The files to be rebuilt are identified from one or more shadow structures. The files are identified by the administrator 22 or other machine that performs this action through communication with the servers 16 that communicate with their corresponding storage areas to draw information from the shadow structures stored therein. The server 16 that is rebuilding the inaccessible segment copies the identified files to a new segment 20. The server 16 labels the new segment 20 preferably with the same segment number as the inaccessible segment 20. The administrator 22 assigns new Inode numbers to the files copied into the new segment 20. The administrator can assign the same Inode numbers as before if so configured or can assign new Inode numbers. The server 16 updates the corresponding directory entries that pointed to files in the inaccessible segment 20 to correspond to the new Inode numbers assigned to the files in the new segment 20. For those files that lost their master files, the server 16 also selects one of the remaining or newly created replicas and promotes it to be the new master file, and updates the directory entry accordingly.

At stage 134, recovery efforts are made. In response to an input/output error being found and indicated, and in response to a determination that a segment 20 is not inaccessible, other appropriate recovery techniques are employed (e.g., alerting a system administrator or failing over a server).

At stage 136, the server 16 writes data to the synchronous replicas $28_1$, $28_2$. The server 16 writes data for new synchronous file replicas $28_1$, $28_2$, or writes the modification data to an existing file replicas $28_1$, $28_2$. The server 16 marks the asynchronous replicas, if any, here the replicas $28_3$, $28_4$, as not ready (NRDY).

At stage 138, an inquiry is made as to whether the data write of stage 136 fails. If the attempted write fails, then the process 110 proceeds to stage 124 for indication of an input/output error. If the attempted write succeeds, then the process 110 launches stage 140 in the background (as indicated by the dotted line to stage 140) and, without waiting for the stage 140 to complete, returns to the application as the synchronous replicas have been successfully completed.

At stage 140, asynchronous replicas are made and/or modified/updated. The server 16 or other machine produces the asynchronous replicas, e.g., the replicas $28_3$, $28_4$, and updates the directory with the Inode numbers of the new replicas $28_3$, $28_4$, and marks the new replicas $28_3$, $28_4$ as ready (RDY) to be accessed and read. Preferably, as seen from FIG. 5, an input/output error is not produced if the production of the asynchronous replicas $28_3$, $28_4$ is unsuccessful.

Figure 6:
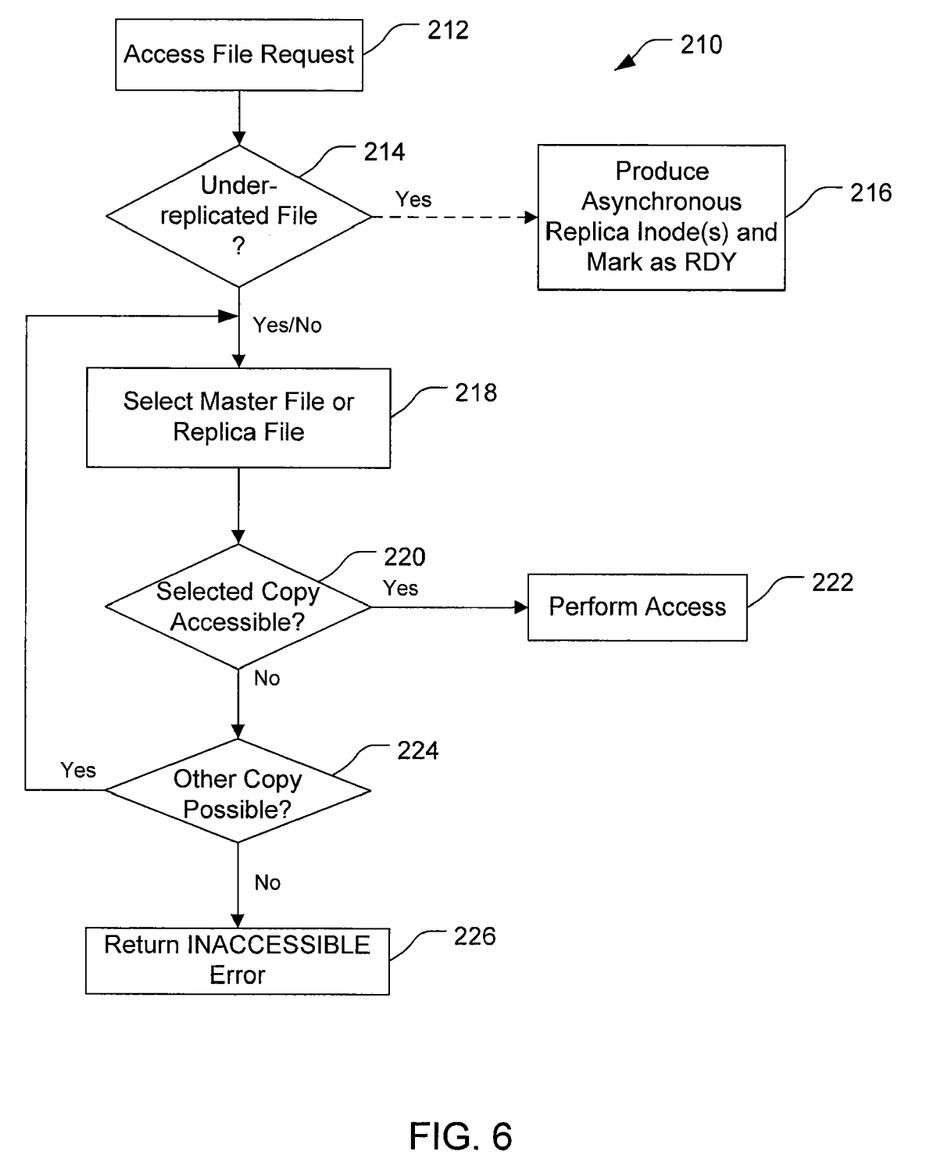
FIG. 6 is a block flow diagram of a process of accessing and using master and replica copies of files.

In operation, referring to FIG. 6, with further reference to FIGS. 1-4, a process 210 includes the stages shown for accessing and using file replicas. The process 210 is exemplary only and not limiting. The process 210 can be altered, e.g., by having stages added, removed, or rearranged. The process 210 describes logic for accomplishing tasks such that any given stage may be implemented by various apparatus of the system 10, e.g., a server 16, a client 12, the administrator 22. For example, an apparatus can communicate with the server 16 owning a directory or file if the logic calls for examination of a directory or replication of a file, respectively. While specific devices are mentioned below for certain tasks, these tasks do not necessarily have to be performed by the noted devices.

At stage 212, a request is received to access a file. For example, the request may be received from a client 12 at a server 16 or from an application process at a client 12.

At stage 214, an inquiry is made as to whether the file to be accessed is an under-replicated file. This inquiry is made, here, by the administrator 22, but could be made by other devices such as the server 16 receiving the request at stage 212, or another server 16. The administrator 22 can determine that the file to be accessed is an under-replicated file if the file is receiving a very high number of access or modification requests. The administrator 22 or client 12 can determine that the file is under-replicated if, for example, access or modification requests are being denied or delayed, especially where there are spots available for one or more replica files for the file in question. The administrator 22 or server 16 can determine that there are available possibilities for additional replica files by analyzing a directory including the corresponding master file and determining whether there are unused slots for replicas. For example, referring to FIG. 3, the master file 24 has four replica files $28_1$-$28_4$ already assigned and one available replica file spot $28_5$. The servers 16 can determine that a file is under-replicated, for example, if the server 16 is producing a master file 24. In this case, the server 16 knows that there are preferably at least two replica files 28 to be made. Further, the server 16 can determine that a file is under-replicated if the server 16 is in the process of producing a first replica $28_1$, in which case the server 16 knows that at least one more replica $28_2$ is preferably to be produced. If it is determined that the file to be accessed is under-replicated, then the process 210 proceeds to stage 216 to be performed in the background (as indicated by the dashed line to stage 216). Regardless of whether it is determined that the file to be accessed is under-replicated, then the process 210 proceeds to stage 218 in the foreground.

At stage 216, asynchronous replicas are made. The server 16 or other machine produces the asynchronous replicas, e.g., the replicas $28_3$, $28_4$, and updates the directory with the Inode numbers of the new replicas $28_3$, $28_4$, and marks the new replicas $28_3$, $28_4$ as ready (RDY) to be accessed and read.

At stage 218, the server 16 or other device selects a copy of the file to be accessed. The server 16 or other device can select any of the master file 24 or the replicas 28. For example, the selection is made in accordance with one of various policies such as the load on the server 16 owning the file, the network latency to the owning server 16, etc.

At stage 220, an inquiry is made as to whether the selected is accessible. The server 16 or other device can send an access request and use a response to this request or another request to determine if the selected copy is inaccessible. If it is determined that the selected copy is accessible, then the process 210 proceeds to stage 222 where the access is performed, and otherwise proceeds to stage 224 discussed below.

At stage 222, the file access is performed. The requesting server 16 or other device sends an access request to the server 16 owning the selected file. The owning server 16 provides access information such as the Inode number and the requesting server 16 or other device uses the access information to access and read from the file.

At stage 224, an inquiry is made as to whether there are other copies of the file, be it the master file 24 or a replica file 28. The server 16 or other device searches the directory entry 40 for other Inode numbers of copies of the file that have not yet been attempted to be accessed. If no other such possible copies exist, then the process 210 proceeds to stage 226 where the server 16 or other device returns an INACCESSIBLE error to the requester. If another possible copy of the file exists, then the process 210 returns to stage 218 to select one of the previously unselected copies.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. Further, while first and second replicas were discussed as being synchronous, and higher-numbered replicas being asynchronous, other implementations are possible, such as more or fewer synchronous replicas, all replicas being synchronous, or all replicas being asynchronous. Further still, the number of replicas may be universal in the file system, or may be different for different files, e.g., being specified on a per-file basis using a system-call interface such as IOCTL in UNIX®. The number of replicas may be changed, with new files and their replicas adhering to the latest change and existing files and their replicas made to conform to the latest change, e.g., by running a utility (program) that scans the file system for old files and performs appropriate changes such as producing or deleting replicas. Also, while the servers were described as being configured to store replicas no server 16 will store both a master file and a replica of that master file, the servers could be configured to store replicas such that the same server could control both a master file and a replica of that master file. In this case, at least one replica would be controlled by a different server. Further, second replicas of files may be constrained to be stored on "mirror" segments associated with the segments storing the first replicas of the files. Third and higher-order replicas may be stored on segments chosen from a replica pool of segments that is controlled by a different server or servers than the server or servers that control(s) the segments storing the first and second file replicas and the master file. Further still, a DAS (directly attached storage) model could be used with segments stored in storage directly attached to respective servers. Even if a server fails, rendering its directly-attached segments inaccessible, the segments can be rebuilt in storage attached to an operational server.

Other embodiments are within the scope and spirit of the invention and the appended claims.

What is claimed is:

1. A system comprising:
   storage configured to store file system entities, including directories and files, residing in segments of a distributed, segmented single file system;
   file servers comprising at least one processor configured to implement the single file system with separate ones of the file servers controlling metadata of separate ones of the segments of the file system entities; and
   a controller configured to control storage of files in the file system such that for a master file stored in a first segment, a first replica of the master file is stored in a second segment that is physically separate from the first segment, the controller being further configured to control storage of directories in the file system such that a single directory entry includes a first identifier pointing to the master file and a second identifier pointing to the first replica, wherein the controller controls storage of replica such that no replica of the master file is stored in the same segment as the master file.

2. The system of claim 1 wherein the controller is further configured such that a second replica of the master file is made and the single directory entry further includes a third identifier pointing to the second replica.

3. The system of claim 2 wherein the single directory entry includes identifiers pointing to all replicas of the master file.

4. The system of claim 1 wherein the first replica is a synchronous replica.

5. The system of claim 1 wherein the controller is further configured such that second and third replicas of the master file are made, wherein the second replica is a synchronous replica and the third replica is an asynchronous replica.

6. The system of claim 1 wherein the controller is configured to store the master file and the first replica based upon a non-hierarchical allocation policy.

7. The system of claim 1 wherein the controller is configured to reproduce an inaccessible segment using replicas in other segments of file system entities in the inaccessible segment.

8. The system of claim 1 wherein the controller is configured to determine frequently-accessed files and to make replicas of the frequently-accessed files.

9. A computer method comprising:
   storing file system entities in segments of a distributed, segmented single file system, the file system entities including directories and files;
   controlling metadata of the segments with file servers comprising at least one processor configured to implement the single file system, with separate ones of the file servers controlling separate ones of the segments of the file system entities;
   storing using a controller configured to control storage of files and storage of directories in the file system a first replica of a master file stored in a first segment, the first replica being stored in a second segment that is physically separate from the first segment; and
   storing with the controller a single directory entry including a first identifier pointing to the master file and a second identifier pointing to the first replica, wherein the controller controls storage of replica such that no replica of the master file is stored in the same segment as the master file.

10. The computer method of claim 9 further comprising:
    storing a second replica of the master file; and
    including a third identifier pointing to the second replica in the single directory entry.

11. The computer method of claim 10 further comprising including identifiers pointing to all replicas of the master file in the single directory entry.

12. The computer method of claim 9 wherein the first replica is a synchronous replica.

13. The computer method of claim 9 further comprising making second and third replicas of the master file, wherein the second replica is a synchronous replica and the third replica is an asynchronous replica.

14. The computer method of claim 9 further comprising storing the master file and the first replica based upon a non-hierarchical allocation policy.

15. The computer method of claim 9 further comprising producing an inaccessible segment using replicas in other segments of file system entities in the inaccessible segment.

16. The computer method of claim 9 further comprising:
    determining frequently-accessed files; and
    making replicas of the frequently-accessed files.

* * * * *